US006722313B2

(12) United States Patent
Wenstrand

(10) Patent No.: US 6,722,313 B2
(45) Date of Patent: Apr. 20, 2004

(54) ALL WEATHER ANIMAL DRINKER

(76) Inventor: Thomas William Wenstrand, 1702 Oakland Mills Rd., Mt. Pleasant, IA (US) 52641

( * ) Notice: Subject to any disclaimer, the term of this patent is extended or adjusted under 35 U.S.C. 154(b) by 60 days.

(21) Appl. No.: 10/166,353

(22) Filed: Nov. 27, 2001

(65) Prior Publication Data

US 2003/0140864 A1 Jul. 31, 2003

(51) Int. Cl.[7] ................................................ A01K 7/02
(52) U.S. Cl. ...................................................... 119/73
(58) Field of Search .............................. 119/73, 77–80

(56) References Cited

U.S. PATENT DOCUMENTS

| | | | | |
|---|---|---|---|---|
| 1,249,999 A | * | 12/1917 | Page ............................ | 119/73 |
| 1,488,086 A | * | 3/1924 | Zieglowsky ................. | 119/73 |
| 1,521,804 A | * | 1/1925 | Dougherty ................... | 119/73 |
| 1,793,431 A | * | 2/1931 | Pelmulder ................... | 119/73 |
| 4,440,112 A | * | 4/1984 | Lilyerd ........................ | 119/73 |
| 4,646,687 A | * | 3/1987 | Peterson et al. ............. | 119/73 |
| 4,704,991 A | * | 11/1987 | Moore ......................... | 119/73 |
| 4,813,378 A | * | 3/1989 | Lapp ............................ | 119/73 |
| 4,856,459 A | * | 8/1989 | Wiseman et al. ............. | 119/73 |
| 4,883,022 A | * | 11/1989 | B. A. Barker ................ | 119/73 |
| 4,930,572 A | * | 6/1990 | Doshier ....................... | 165/45 |
| 5,345,063 A | * | 9/1994 | Reusche et al. ............. | 219/441 |

* cited by examiner

Primary Examiner—Son T Nguyen
(74) Attorney, Agent, or Firm—Robert A. Brown

(57) ABSTRACT

An all weather animal drinker for horses in stalls of a stable or outside in pasture and/or for other animals inside of a barn or outside of a structure in an unprotected environment. The all weather animal drinker is effective to be used inside a stable or barn or outside in an area subject to all types of climatic elements so as to provide potable water to animals or poultry under extremely hot or severely cold weather conditions. The all weather drinker includes a plurality of wells or reservoirs for circulation of temperature controlled water therebetween by use of a heating element along with various plumbing connections to operate at temperatures as low as minus thirty degrees Fahrenheit.

20 Claims, 3 Drawing Sheets

ALL WEATHER ANIMAL DRINKER

BACKGROUND OF THE INVENTION

The present invention relates generally to a device for providing a ready reservoir for livestock to obtain water therefrom and more particularly to an all weather animal drinker for horses in stalls of a stable and/or for other animals inside of a barn or outside of a structure in an unprotected environment. The all weather animal drinker is effective to be used inside a stable or barn, or outside in an area subject to all types of climatic elements so as to provide potable water to any species of animal or poultry under extreme weather conditions, either extremely hot or severely cold.

DESCRIPTION OF THE PRIOR ART

The prior art discloses and teaches various configurations and structures relating to a number of different types of drinkers for horses or other animals. Several drinkers utilize a float type control to provide livestock a continuous supply of water. Float type drinkers take up excessive space in a stall, are complex and mechanically complicated to fabricate, and thus result in a high priced unit.

Other drinkers provide a paddle type of animal waterer and are simple in structure, effective and economical. Paddle drinkers, however, suffer from the disadvantage of inability to provide heated water.

Certain drinkers on the market do provide a unit that is effective. These units, however, are mechanically complicated and require a great many expensive machined parts, cast aluminum components and/or stainless steel parts. Other units are somewhat effective, and may work well in an interior stable environment, but do not perform properly in a cold outdoor atmosphere because there is no provision for preventing freezing of control valves and the like.

SUMMARY OF THE INVENTION

Therefore, it is a primary object of the present invention to provide an improved an all weather animal drinker that includes an integral, self contained housing having a well formed in the drinker from which horses, cows or other livestock may easily obtain therefrom a constant supply of fresh drinking water.

It is a further object of the present invention to provide an improved all weather animal drinker that includes a self contained housing wherein there is disposed an equipment cavity for placement therein of mechanical equipment devices to control the supply of water to the well and to heat the same.

An additional object of the present invention is to provide an improved all weather animal drinker that includes a self contained housing that includes a lower chamber for placement therein of plumbing and heating devices for drainage and heating of water in the water well.

A still further object of the present invention is to provide an improved all weather animal drinker that includes a self contained housing that includes an outer shell which envelops and surrounds the housing about its vertical sides.

Another object of the present invention is to provide an improved all weather animal drinker wherein a supply of water is maintained at a constant drinkable temperature from an ambient atmosphere to a temperature as low as minus thirty degrees Fahrenheit.

BRIEF DESCRIPTION OF THE DRAWING

The foregoing and other characteristics, objects, features and advantages of the present invention will become more apparent upon consideration of the following detailed description, having reference to the accompanying figures of the drawing, wherein.

DESCRIPTION OF A PREFERRED EMBODIMENT

Figure 1:
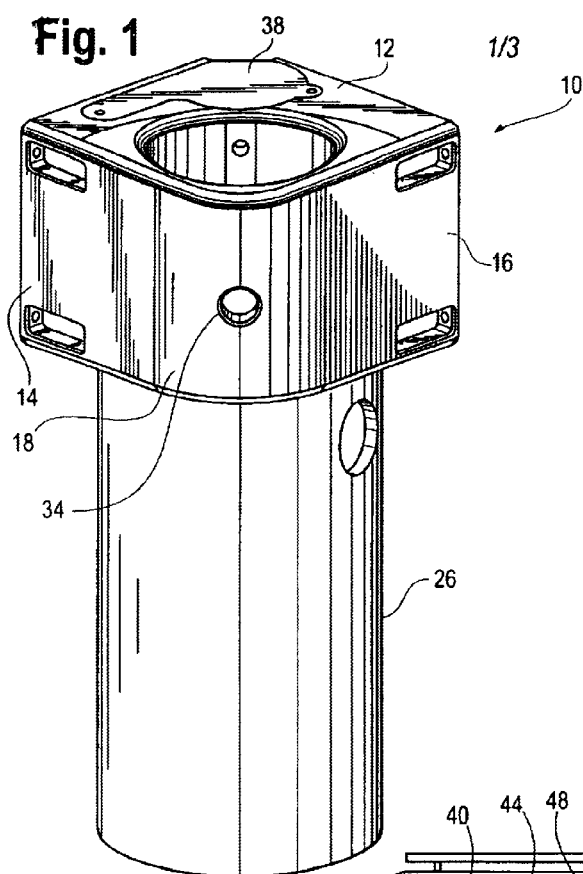
FIG. 1 is a perspective view of an improved all weather animal drinker showing a top side thereof having a drinking well and a P-shaped top cover plate for protecting a depending equipment cavity wherein a submersible antisiphon fill valve is located along with a heater element. The drinker is shown mounted on an insulated cylinder which may be installed in pastures or other locations outside of the protection of a stable or barn.
Figure 2:
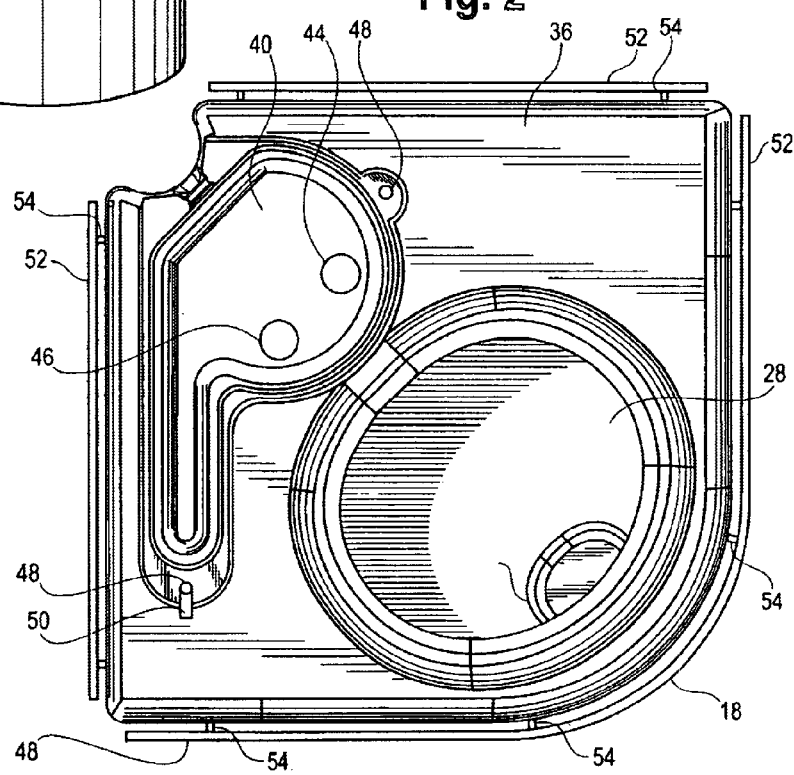
FIG. 2 is a top side plan view of an improved box stall drinker showing the structure of a back side and a left side separated by a half moon concave vertical surface and the elliptically shaped drinking well. The P-shaped top cover plate is removed to show the interior of a reservoir and a space to accommodate a heating element. There is also shown a nominal top edge of vertical panels or shell structure for enveloping the box stall drinker and being adaptable to be spaced from the sides thereof, but attached thereto by connections to inserts disposed in the side walls of the drinker.
Figure 3:
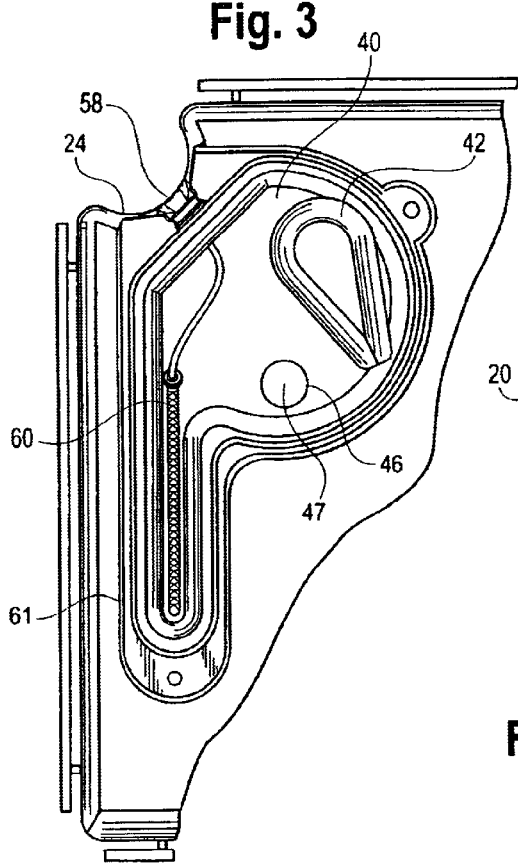
FIG. 3 is a partial top side view of an improved all weather animal drinker showing the top cover plate removed from the depending equipment reservoir cavity and depicting the water valve and heating element disposed therein.
Figure 4:
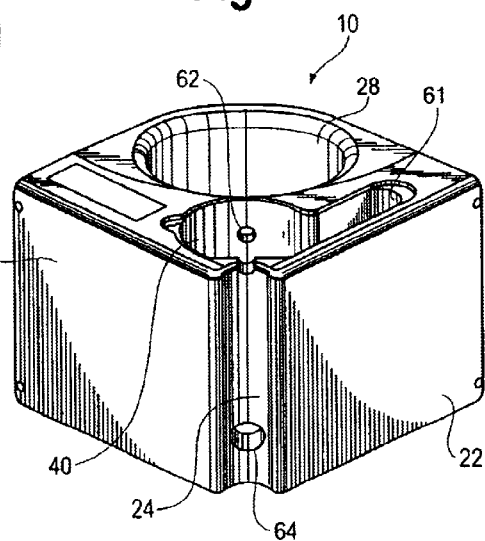
FIG. 4 is a back side perspective view of an improved all weather animal drinker showing the detailed construction of the concave vertical surface adapted to accommodate and receive therein piping, plumbing and/or electrical connections.
Figure 5:
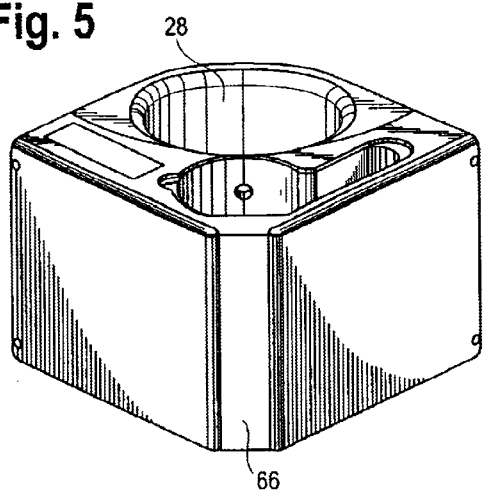
FIG. 5 is a back side perspective view of an improved all weather animal drinker similar to FIG. 4, but showing a vertical cover plate for protecting the piping, plumbing, and/or electrical connections contained in the vertical concave cavity.

Referring now to FIGS. 1–8, there is shown in perspective an improved All Weather Animal Drinker, generally indicated by reference numeral 10, including a housing 12 constructed in the form of a rounded-off parallelepiped and having a left side frontal surface 14, a right side frontal surface 16, and a circular frontal surface 18, extending around and joining the left side 14 and the right side 16 in a continuous integral surface therebetween. The drinker 10 viewed from the rear as shown in FIGS. 4 and 5 shows in elevation a left side back surface 20, a right side back surface 22, and in elevation, a concavely shaped rear outer surface 24 extending between and joining the left side 20 and the right side 22 in a continuous integral vertical outer surface therebetween. A vertical insulated heat tube, cylinder or supporting structure 26 may at times be provided for maintaining the drinker in a location outside of a stable in the event that it is desirable to provide a drinker primarily for horses while in pasture, but equally applicable for other animals which may graze in areas beyond the immediate confines of a stable or barn. The cylinder 26 is formed from inner and outer concentric walls with insulation integrally molded therebetween and protects water from freezing in plumbing connections leading to the drinker.

FIG. 2 shows the drinker 10 and illustrates in detail a water well 28, a lower portion 30 of a bottom surface 32 of the water well 28, which although not specifically shown, slopes downwardly to a drain opening 34 (See FIG. 6) formed though the frontal curved surface or wall 18 of the drinker. It should be noted that opening 34 is positioned at a lower elevation than an opening 68 (hereinafter explained in greater detail) to prevent flooding of a reservoir cavity 40 connected thereto. This difference in elevation ensures that in the event of a malfunction of a hereinafter described submersible fill valve 42, water will be discharged from the drinker through opening 34.

Disposed upon a top surface 36 of the drinker 10 is a P-shaped top cover or access plate 38 that serves to enclose the reservoir cavity 40 wherein are disposed the submersible antisiphon fill valve 42 and a heater element (See FIG. 3). The reservoir cavity 40 includes a first aperture 44 for receiving the fill valve 42 in secured connection therewith, and a second aperture 46 for draining or discharging water from the reservoir cavity 40. The opening 46 may at times receive therein a fitted plug or other suitable means for selective closing thereof. The P-shaped cover or access plate 38 is secured to the top surface 36 of the drinker by turn down screws 48 and/or other suitable means, such as a spring loaded pin 50, for positively securing the cover plate 38 to the top surface 36 of the drinker 10. The top surface 36 is sloped downwardly from the reservoir cavity 40 toward the circular frontal surface 18 so that in the event the fill valve 42 plugs up, or otherwise becomes inoperative, water will flow away from the reservoir cavity 40 and over the frontal curved surface 18.

A plurality of outer vertical panels 52 are disposed about and spaced from each of the outer surfaces 14, 16, 18, 20, and 22 of the drinker and attached thereto by a plurality of connecting members 54 embedded in inserts 56 formed in the vertical side surfaces 14, 16, 18, 20 and 22 of the drinker 10.

Next referring to a top partial top side surface as shown in FIG. 3, wherein the top cover plate 38 is removed, there is depicted the submersible antisiphon fill valve 42 that delivers a fluid flow of about two and one half gallons per minute and is effective to adjustably maintain a predetermined water level in the water well 28. Also shown is the drain connection aperture 46 for removal of water from the reservoir cavity 40. It will be noted there is a notch 58 extending between the top level of the reservoir cavity 40 and a top portion of the half moon or concave vertical surface 24 formed on the back side of the drinker.

The notch 58 is disposed to receive therein an electrical cord connected to an electrical heating element 60 that preferably provides 250 watts at 110 volts. The electrical element 60 has a capacity to prevent water from freezing in the water well 28 at minus thirty degrees Fahrenheit for an indefinite period of time. The heating element 60 is formed to fit in or nestle into a leg 61 of reservoir cavity 40 in order to transfer heat quickly to the water and establish efficient circulation between the reservoir cavity 40 and the drinker well 28

In FIG. 4, there is shown a top aperture or bore 62 disposed within the water reservoir cavity 40 extending into the water well 28 and acts as a supply conduit opening thereto. Also, a lower opening 64 is disposed at a bottom portion of the concave rear surface 24 so as to facilitate placement of the heating element electrical cord into the insulated cylinder 26. The opening 64 is also operable to accommodate a drain hose connected to second aperture 46 in order to drain water from the reservoir cavity 40 through the insulated cylinder 26.

FIG. 5 shows similar structure to FIG. 4, except there is located a vertical cover plate 66 to protect the electrical cord that leads to the heating element located in the reservoir cavity 40 and the plumbing connection opening 40 disposed in the bottom wall thereof.

Figure 6:
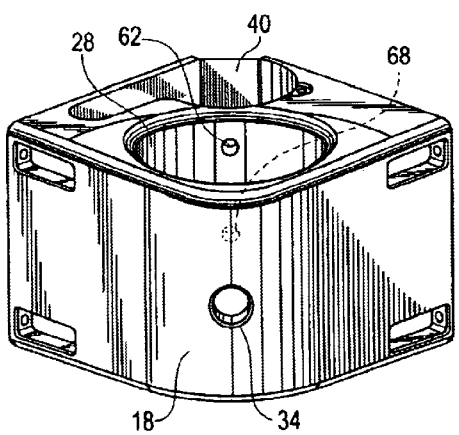
FIG. 6 is a top side perspective view of an improved all weather animal drinker showing vertically aligned apertures to permit circulation of water between the animal drinking well and the water reservoir cavity.

In FIG. 6, an added detail is shown wherein the upper opening or aperture 62 is aligned vertically or directly above a lower opening or aperture 68 for circulation of water between the reservoir 40 and the water well 28. The heating element 60 has an enclosed adjustable thermostat operable to provide a desired temperature of water, preferably to turn on at 35 degrees and off at fifty to sixty degrees Fahrenheit. The water rises to the upper opening 62 and because of the difference in density of cooler water in the water well, begins to flow through the upper opening 62 into the water well. The cooler water in the water well 28 settles to the bottom thereof and circulates through the lower opening 68 between the water well and back into the reservoir 40. As a result, water in the well 28 is maintained at a desired temperature for watering horses or other animals. It should be noted that whenever icing begins to form and is observed at the upper level opening 62, it is possible to adjust, either manually or by a thermostatically controlled element, to raise the water level so that the upper level opening 62 is at least partially closed or under water in order to increase the rate of flow of water circulating therethrough and thereby prevent further icing in the water well 28. This mode of operation is achievable either inside the confines of a stable or outside in an unprotected environment that might register a temperature of a minus thirty degrees Fahrenheit.

Figure 7:
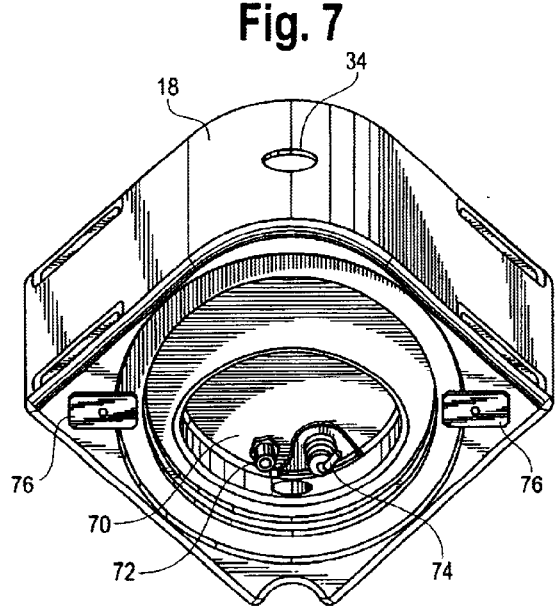
FIG. 7 is a bottom side perspective view of an improved all weather animal drinker showing the internal structure of a lower chamber disposed below the drinking well and having a drain and water supply connection disposed in an upper ceiling wall thereof. There are also shown rotatable clips adaptable to be moved into secured engagement with the supporting cylinder shown in FIG. 1.
Figure 8:
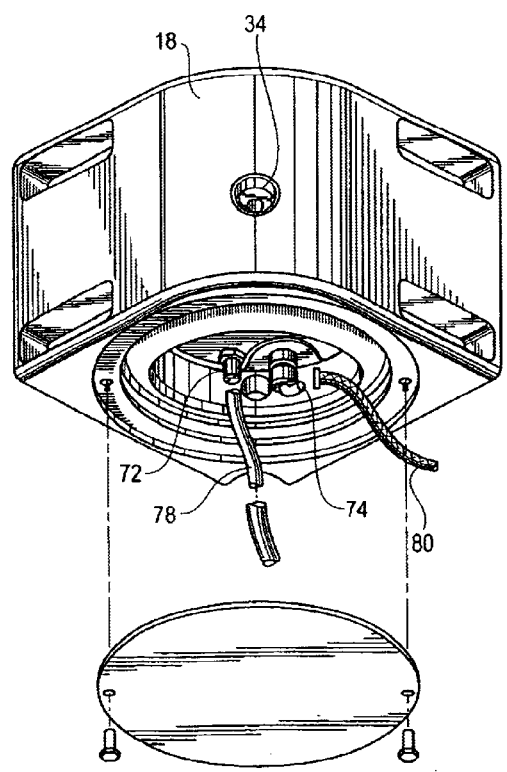
FIG. 8 is a bottom side perspective view of an improved all weather animal drinker showing additional details of the devices located in the lower chamber including a drain hose for attachment to a threaded connection along with a water supply conduit for connection to a second threaded connection disposed in the bottom wall of the reservoir cavity. The bottom or lower cover plate is shown in a removed condition from the drinker.

FIGS. 7 and 8 show internal structure of a lower chamber 70 having a drain connection 72 and a water supply connection 74. There are also shown adjustable clips 76 to secure the drinker 10 to the cylinder 26. Further, there is shown a hose 78 connected to the drain connection 72 and a flexible water supply conduit 80 connected to the water supply connection 74.

While the present invention has been described with reference to the above preferred embodiments, it will be understood by those skilled in the art, that various changes may be made and equivalence may be substituted for elements thereof without departing from the scope of the present invention. In addition, modifications may be made to adapt a particular situation or material to the teachings of the present invention without departing from the scope of the present invention. Therefore, it is intended that the invention not be limited to the particular embodiments disclosed in carrying out this invention, but that the present invention includes all embodiments falling within the scope of the appended claims.

I claim:

1. An all weather animal drinker for providing a constant supply of drinking water for livestock, comprising
    a single unit integrally formed housing constructed in the shape of a rounded-off parallelepiped, having a water well formed therein for storing said drinking water,
    said housing including a first side frontal surface, a second side frontal surface and a circular frontal surface integrally connected therebetween, said housing including a first side back surface, a second side back surface and an inwardly directed concavely shaped rear outer surface integrally connected therebetween, said first frontal surface seamlessly connected to said second side back surface and said second side frontal surface seamlessly connected to said first side back surface, said housing including a top surface seamlessly connected to upper edges of each said frontal and back surfaces, and a bottom surface seamlessly connected to lower edges of each said frontal and back surfaces to form said single unit integrally formed housing, said housing having a reservoir cavity formed therein to supply a selected volume of said drinking water to said water well, said reservoir cavity having a first aperture disposed at a bottom surface thereof and an at times closable second aperture disposed at said bottom surface for drainage therefrom, said water well and said reservoir being connected by a top aperture and a bottom aperture providing a difference in water head pressure to induce circulation of said drinking water therebetween, said water well having a bottom surface sloped downwardly to a drain opening formed through said frontal surface, a water supply connection disposed on said housing to provide water to said reservoir, and adjustable fill valve means disposed in said first aperture of said reservoir for delivering thereto said selected volume of said drinking water from said supply connection and maintain a desired water level therein, whereby said difference in water head pressure between top and bottom portions of said reservoir permits said water to circulate through said top aperture to said water well and return through said lower aperture to Said reservoir.

2. An animal drinker as claimed in claim 1 comprising,
heater element means disposed in said reservoir for at times heating and maintaining said drinking water at a preselected temperature.

3. An animal drinker as claimed in claim 2 wherein
said heater element means maintains said drinking water in said reservor at a range of between 34 degrees and 55 degrees Fahrenheit.

4. An animal drinker as claimed in claim 1 comprising,
a cylindrical column for supporting the housing at any selected location, said column including inner and outer walls, insulation disposed between said inner and outer walls so as to protect mechanical, plumbing and electrical equipment located within said inner wall from climatic elements.

5. An animal drinker as claimed in claim 1 wherein,
said housing has an opening formed therethrough disposed at an elevation lower than said bottom aperture connecting said water well with said reservoir for drainage of excess flow of said drinking water.

6. An animal drinker as claimed in claim comprising,
said water well having a lower portion of a bottom surface sloping downwardly to said drain opening formed through said frontal surface of the housing for at times draining drinking water therefrom.

7. An animal drinker as claimed in claim 1 wherein said housing includes said concavely shaped back corner vertical surface operable to receive a tube-like structure in complementary association therewith so as to provide enclosure for mechanical, plumbing and electrical equipment connected to the drinker.

8. An all weather animal drinker for providing a constant supply of drinking water for livestock, comprising
a discrete single unit housing, constructed in the shape of a rounded-off parallelepiped, said housing including a plurality of side frontal surfaces seamlessly connected thereto, and top and bottom surfaces seamlessly connected respectfully to upper and lower edges of each of said side frontal surfaces, a water well formed in said housing for storing said drinking water, a reservoir formed in said housing to supply a selected volume of said drinking water to said water well, said water well and said reservoir being connected by a top aperture and a bottom aperture for circulation of said drinking water therebetween, a water supply connection disposed on said housing to provide water to said reservoir, and adjustable valve means disposed in said reservoir for delivering thereto said selective volume of said drinking water control from said supply connection and maintain a desired water level therein, whereby a difference in water temperature between top and bottom portions of said reservoir permits said water to circulate through said top aperture to said water well and return through said lower aperture to said reservoir.

9. An animal drinker as claimed in claim 8 comprising,
heater element means disposed in said reservoir for at times heating and maintaining said drinking water at a preselected temperature.

10. An animal drinker as claimed in claim 9 wherein said heater element means maintains said drinking water in said reservoir at a range of between 34 degrees and 55 degrees Fahrenheit.

11. An animal drinker as claimed in claim 8 comprising,
a cylindrical column for supporting the housing at any selected location, said column including inner and outer walls, insulation disposed between said inner and outer walls so as to protect mechanical, plumbing and electrical equipment located within said inner wall from climatic elements.

12. An animal drinker as claimed in claim 8 wherein said housing includes a concavely shaped back corner vertical surface operable to receive a tube-like structure in complementary association therewith so as to provide enclosure for mechanical, plumbing and electrical equipment connected to the drinker.

13. An all weather animal drinker comprising,
a single unit integrally formed housing constructed in the shape of a rounded-off parallelepiped, a left frontal surface and a right frontal surface seamlessly connected by a circularly shaped frontal surface, said left and right frontal surfaces seamlessly connected to right and left back side surfaces having disposed therebetween an inwardly directed concavely shaped rear back corner vertical surface, a water well formed in said housing for storing said drinking water, a reservoir formed in said housing to supply a selected volume of said drinking water to said water well, said water well and said reservoir being connected by a top aperture and a bottom aperture providing a difference in water head pressure to induce circulation of said drinking water therebetween, a water supply connection disposed on said housing to provide water to said reservoir, and adjustable valve means disposed in said reservoir for delivering thereto said selective volume of said drinking water from said supply connection and maintain a desired water level therein, whereby said difference in water head pressure between top and bottom portions of said reservoir permits said water to circulate through said top aperture to said water well and return through said lower aperture to said reservoir.

14. An animal drinker as claimed in claim 13 comprising, heater element means disposed in said reservoir for at times heating and maintaining said drinking water at a preselected temperature.

15. An animal drinker as claimed in claim 14 wherein said heater element means maintains said drinking water in said reservoir at a range of between 34 degrees and 55 degrees Fahrenheit.

16. An animal drinker as claimed in claim 13 comprising, a cylindrical column for supporting the housing at any selected location, said column including inner and outer walls, insulation disposed between said inner and outer walls so as to protect mechanical, plumbing and electrical equipment located within said inner wall from climatic elements.

17. An animal drinker as claimed in claim 13 comprising, a top surface of said housing being sloped forwardly and downwardly from the reservoir to said circularly shaped frontal surface so as to permit water to flow thereover and away from the reservoir.

18. An animal drinker as claimed in claim 13 comprising, a plurality of outer vertical panels disposed about and spaced from each of the outer vertical surfaces of the housing, and a plurality of connecting members affixed between said outer vertical panels and the outer vertical surfaces of the housing.

19. An animal drinker as claimed in claim 13 wherein said concavely shaped rear back corner vertical surface has disposed at its top side a notch to provide strain relief for a connecting cord of said heater element.

20. An animal drinker as claimed in claim 13 wherein said concavely shaped rear back corner vertical surface is operable to receive a tube-like structure in complementary association therewith so as to provide enclosure for mechanical, plumbing and electrical equipment connected to the drinker.

* * * * *